Figure 1:
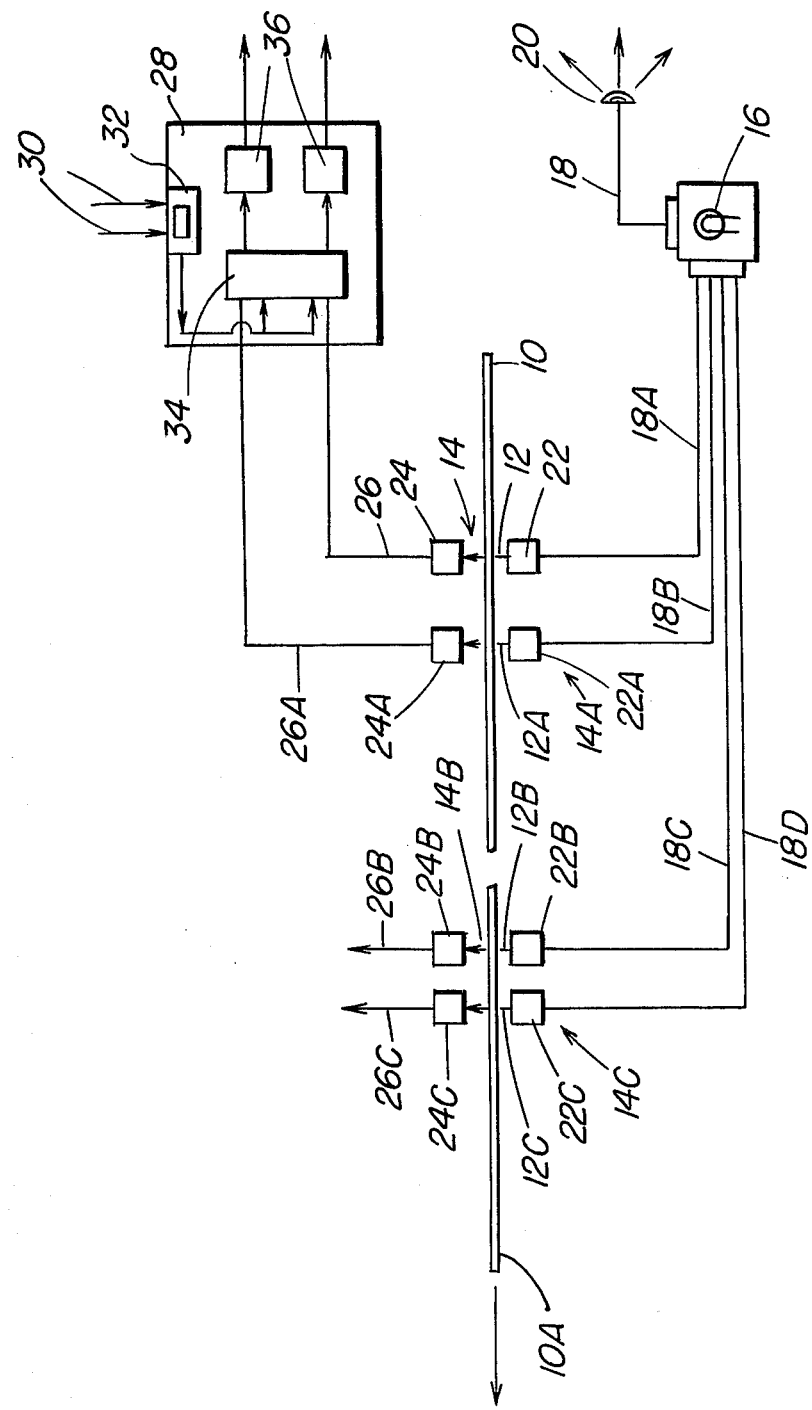

United States Patent [19]

Sussman

[11] 4,085,928

[45] Apr. 25, 1978

[54] FOLDING SYSTEM WITH PHOTOELECTRIC DETECTION MEANS

[76] Inventor: Arthur Sussman, 299 Briarcliff Rd., Teaneck, N.J. 07666

[21] Appl. No.: 762,274

[22] Filed: Jan. 25, 1977

Related U.S. Application Data

[63] Continuation-in-part of Ser. No. 646,271, Jan. 2, 1976, abandoned.

[51] Int. Cl.$^2$ .......................... G02B 5/14; H01J 5/16; H01J 39/12
[52] U.S. Cl. ................................ 270/61 R; 250/227; 250/571; 270/68 R; 270/69
[58] Field of Search ...................... 250/559, 571, 227; 270/69, 68 R, 61 R

[56] References Cited

U.S. PATENT DOCUMENTS

| | | | |
|---|---|---|---|
| 3,773,315 | 11/1973 | Tsien | 270/69 |
| 3,806,730 | 4/1974 | Tirkkonen et al. | 250/227 |

Primary Examiner—Alfred E. Smith
Assistant Examiner—David K. Moore

[57] ABSTRACT

A system comprising a light source, a plurality of fiber form optical light guides each having one end proximate to said light source and in a position to operatively receive light input therefrom; light projector means proximate to and in a position to receive light from the other end of at least some of said light guides; photodetector means spaced from and optically aligned with said projector means adopted and positioned to receive light projected from said light projection means; sheet or film form material intermittently disposed in moving contact with said light projector means and disposed between said light projector and said photo-detector; and means, operative in response to the modulating effect of said sheet form material on said light projector-photo-detector combination, for performing a function on said sheet form material.

6 Claims, 3 Drawing Figures

FOLDING SYSTEM WITH PHOTOELECTRIC DETECTION MEANS

This application is a continuation-in-part of application, Ser. No. 646,271, filed Jan. 2, 1976 and now abandoned.

This invention relates to novel means for controlling operations being performed on sheet and/or film form objects. More particularly this invention refers to and will be described with respect to an operation for folding a multiplicity of individual sheet or film form objects, such as plastic bags or fabric bed sheets.

It is usual for commercial laundries to mechanically fold sheets and pillow cases. In fact, large and rather elaborate machines are marketed and widely used for this purpose. Similarly, the plastic bag industry uses rather elaborate folding machines for packaging. In both situations the folding mechanisms are actuated by the sheet form article to be folded tripping a switch mechanism. It is conventional to use mechanical microswitches which are physically actuated by contact with a lever arm on the switch.

It is alternatively conventional to use electric eyes for this purpose. In this conventional system a multiplicity of individual light sources is used to monitor the movement of sheet form articles, activating and inactivating various mechanical and/or pneumatic devices which actually do the folding.

The prior art devices work well enough to be almost universally used commercially. However there are certain problems associated with them. In regard to mechanical micro-switches, they wear out at an unacceptably high rate. They are also subject to malfunction in that the sheet form material is very limp and very light. With use, the switches have reduced reliability because the sheet form material may not trip them. In regard to photoelectric cells, there is a reliability problem in that the light projection surfaces get dirty and lint covered with use. Further, since there are a series of different individual electric eyes each with its own light source, there is a strong possibility of failure of only one of a series of photo electric eyes which becomes inoperative and may not be noticed until a malfunction in the folding sequence has taken place and cause a machine stoppage and possible breakdown through jamming. As a practical matter, moreover, it is most difficult and inconvenient to replace individual photoelectric systems because these are often located in very hard to get at places.

It is therefore an object of this invention to provide novel means for controlling and activating mechanical folding means for use with sheet or film form materials.

It is another object of this invention to provide improved reliability in folding mechanisms for sheet and film form material.

Other and additional objects of this invention will become apparent from a consideration of this entire specification including the drawing and claims.

Figure 2:
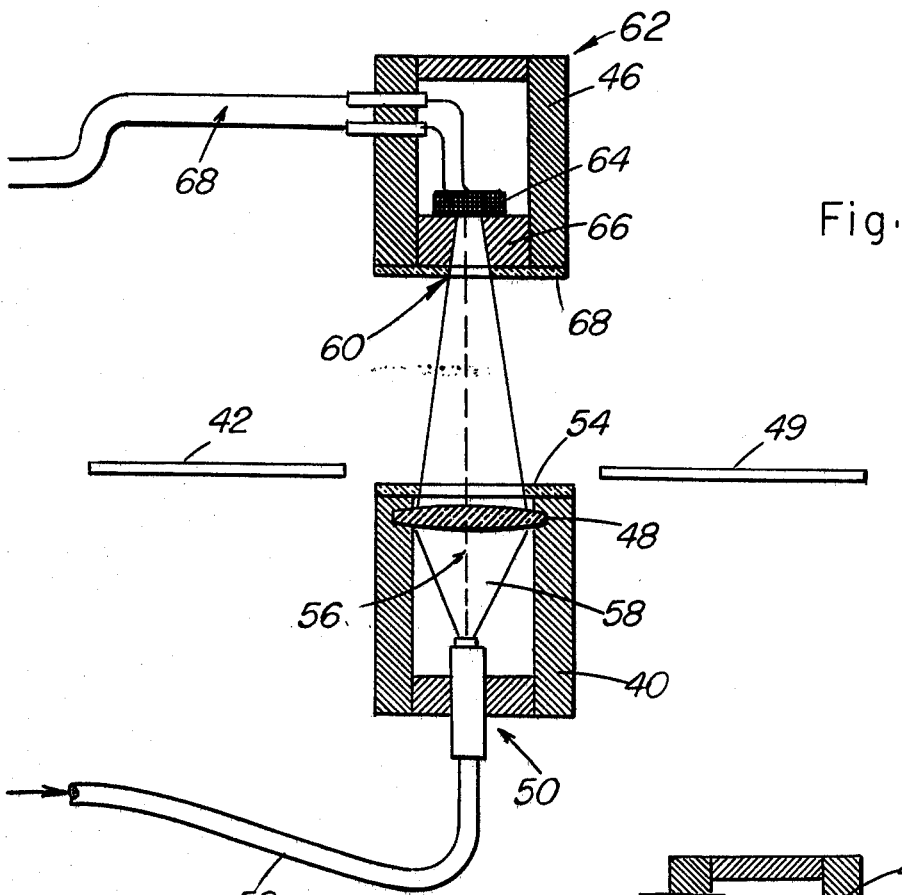
Figure 3:
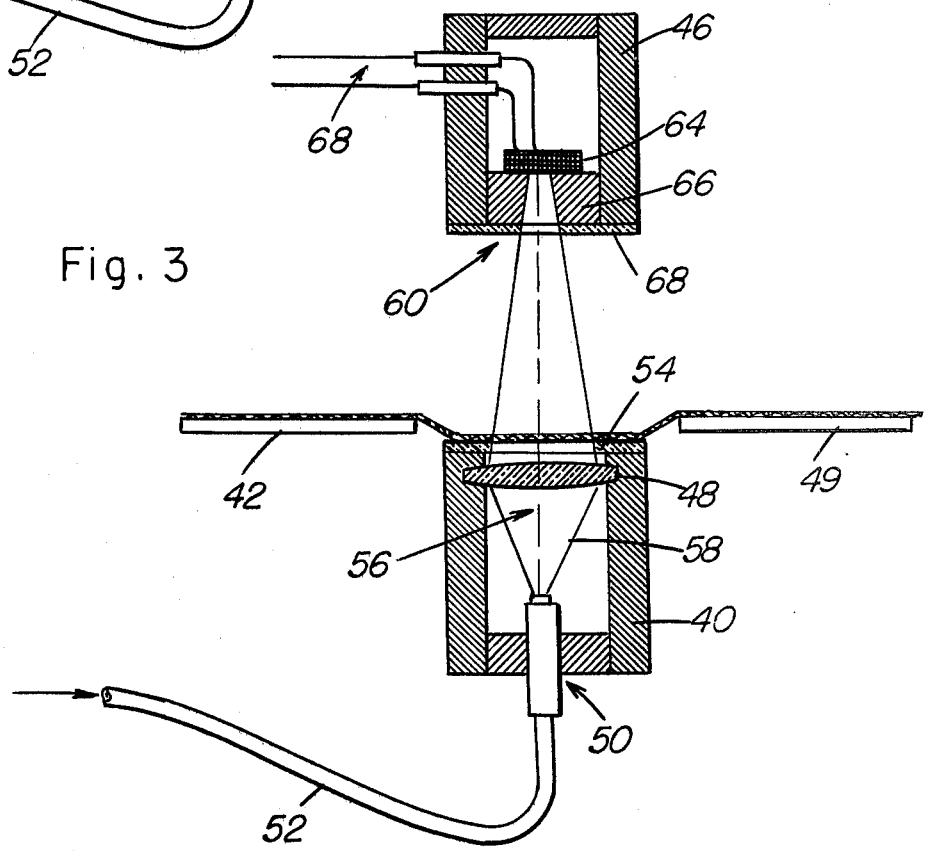

Understanding of this invention will be facilitated by reference to the accompanying drawing in which FIG. 1 is a schematic diagram of the operation of one embodiment of this invention and FIGS. 2 and 3 are crossection schematic views of a sensor assembly used in this invention.

In accord with and fulfilling these objects, one aspect of this invention resides in a novel monitoring and activating device of greater reliability than prior devices for use in connection with mechanical means for folding multiple sheet or film form articles.

The folding machinery to which the novel control device of this invention is applied is suitably conventional in that it is composed of a longitudinal rolling or belt means for transporting the sheet or film form work piece into the folding mechanism. At the proper time, usually initiated by the leading edge of the sheet article engaging a switcing means, or a finite time delay therefrom; pneumatic means, either vacuum or pressure jets causes this leading edge to be restrained while the trailing edge of the workpiece continues to progress. When the work piece progresses far enough, the trailing edge thereof activates a switching mechanism which, immediately or after a finite time, causes the pneumatic means to be released thereby juxtaposing the leading and trailing edges of the work piece and thus "folding" it. There are known mechanisms for transversely folding sheet or film form work pieces which are similarly activated by mechanical or photo electric means.

According to this invention a novel activating mechanism comprises a single light source, remote from the above described switching means, preferably a source of collimated light such as a laser or a more conventional light source with an appropriate light collimating lens system; a plurality of optical fiber light guides optically aligned at one end thereof with the remote light source; at least one light projector means remote from the light source and optically aligned with the end of a fiber light guide opposite to the end thereof adjacent the light source; support means for the light projector means adopted to position the projecting surface of the light projector means to contact the workpiece being folded; photo detector means spaced from and optically aligned with the light projector adopted to receive light projected therefrom or to be denied at least the full extent of such light by reason of the inter-position of the workpiece; and means to activate the folding mechanism as a function of the degree of light received by said photo detector.

In a preferred aspect of this invention there is at least one beam-splitter, preferably a half silvered mirror means, associated with the collimated light beam. An additional optical fiber light guide is provided from the beam-splitter to a monitoring location at which the integrity of the system can be continuously or intermittently monitored. It is also preferred to provide a plurality of beam-splitters and optical fiber light guides all operative from a single, easily accessible light source to power and operate a plurality of remote light projector/photo detector combinations.

In a most preferred embodiment of this invention, a master control, by which power to the folding machine is permitted or denied, is directly coupled to one of the optical fiber light guides. The system is so constructed as to permit power to the machine only when light flows through the light guide, i.e., only when the light source is operative. The switch activating mechanism, composed of light guides, light projectors, photodetectors and a single light source is not subject to any substantial incidence of failure by reason of use at any point except the remote light source itself. Failure of the light source will have the same effect as interposing a workpiece between the projector and detector. Therefore failure of the remote light source will cause a major upset in the machine operation. Thus in this preferred configuration, should the remote single light source become inoperative, power to the machine will instantly be interrupted whereby shutting it down before any damage is caused.

It should be understood that the individual components of the instant control system may all be per se conventional and this is a major advantage because it helps to keep the cost of the system including maintenance and replacement parts low. The invention here is in the combination and arrangement of the per se known parts to produce an important function which is not otherwise producible with the same or similar reliability.

Referring now to the drawings and more particularly to FIG. 1 thereof: a series of work pieces 10, 10A, suitable for folding, are moved along a conveyance, not shown, by conventional means toward a folding mechanism, not shown. As the workpiece progresses, it intercepts a plurality of light beams 12, 12A, 12B, 12C which are part of a plurality of control devices 14, 14A, 14B, 14C according to this invention.

The control apparatus of this invention comprises a single remote light source 16 and a plurality of optical fiber light guides 18, 18A, 18B, 18C, 18D, each having an end optically aligned with the light source 16. In a preferred embodiment of this invention, one of the light guides 18 is used for verification purposes and thus terminates at its other end in a viewing assembly 20 or in a switching mechanism for controlling power to the downstream folding machine or both. The other light guides 18A, 18B, 18C, 18D, each terminate in a separate light projector 22, 22A, 22B, 22C each of which is adjacent to and preferably in rubbing contact with the work pieces 10, 10A. The drawing does not show this contact to facilitate understanding and clarity. A plurality of light beams 12, 12A, 12B, 12C, which is the same light as was originally projected from the light source 16 but now split, is projected from the light projectors 22, 22A, 22B, 22C through the path of the work pieces 10, 10A to be received by photoreceptors 24, 24A, 24B, 24C and from then transmitted, preferably as light, but alternatively as photoelectric impulses, via light guides or wires, respectively, 26, 26A, 26B, 26C to appropriate switching mechanisms such as shown for example at 28. The depicted switching mechanism 28 is suitably composed of an input line voltage 30 which is fed, via transformer 32, to a logic board 34 by which it is suitably conformed and fed to an output relay means 36 which controls the downstream folders.

Referring now to FIG. 2, a useful sensor assembly comprise: a projector housing 40 mounted slightly below and in between two adjacent belts 42, 49 of the conveyor, and a photoreceiver housing 46 mounted directly above and in line with the projector. Each projector housing assembly 40 contains an optical lens 48, an input coupling 50 for the fiber optics cable 52, and a transparent cover 54 mounted at the top of the housing. The fiber cable coupling 50 provides for adjusting the cable 52, and aligns the end of the fiber cable to the axis 56 of the optical lens. The light 58 transmitted through the cable exits from the end of the cable and is transmitted through the optical lens 48, and focused upon an input end 60 of a photo-receiver assembly 62 mounted directly above the projector assembly 40.

The photo-receiver assembly 62 houses a light detector 64 that requires no direct electrical power input, a light baffle 66 which filters the light focused on the receiver input, and a transparent cover 68 which is sealed to the lower end of the receiver housing 62. The light focused on the input end of the receiver is transmitted through the cover plate, through the light baffle and onto the light detector surface. The detector converts the light to a small current which is transmitted along electrical wire 68 to a control box 28 which activates the proper fold mechanism used to complete a particular fold.

Self-cleaning of the projector is accomplished by mounting the projector sufficiently close to the conveyor that a laundry item 70 (FIG. 3) in its passage moves in sliding proximity to the projector cover so as to cause lint that otherwise would gather on the projector cover surface to be removed either by direct contact or by causing a current of air to pass over and therefore clean the surface.

The light baffle 66 contained within the photo-receiver permits the system to operate in a high ambient light environment. The baffle consists of a chamfered hole in a material of a finite thickness, above which is mounted the detector.

The baffle is designed to accept all of the light transmitted by the projector, and to block out the major portion of the background light. This light reflected from the surroundings will not affect system operation.

The sensors also eliminate what could otherwise be a dangerous fire hazard considering the amount of lint found typically in a laundry environment.

With the use of fiber optics, no electric power or heat is transmitted to the sensors in the subject invention, therefore laundry items that may jam within the machine do not create a fire hazard from heat build-up, nor from electrical shorts that could otherwise occur during workpiece removal.

What is claimed is:

1. In an apparatus for folding sheet or film form material comprising means to propel a plurality of foldable work pieces toward a folding means; switch control means operative in combination with said work piece adapted to activate said folding means; the improvement which comprises said switch control means comprising a remote light source; a plurality of optical fiber light guides each having one end in optical alignment for reception of light from said light source and the other end optically aligned, through an optical cable coupling means, with an optical lens in a projector assembly; mounting means which positions said projector assembly in cleaning relation proximate to said workpieces; photo receptor means comprising photo detector means, spaced from and optically aligned with said projector assembly adapted to permit passage of said work pieces between said receptor means and said projector assembly in a light modulating manner; and means, associated with and operated by each of said photo receptor means, to activate and inactivate respectively said folding means as a function of said workpiece induced light modulation.

2. The improved apparatus claimed in claim 1 wherein said light is collimated.

3. The improved apparatus claimed in claim 1 including remote light verification means comprising one of said light guides and a direct readout means optically aligned with one end thereof.

4. The improved apparatus claimed in claim 1 including master power control switch means operatively activated by light from said remote light source passed through an optical fiber light guide.

5. The improved apparatus claimed in claim 1 including mounting means for said light projection means so positioned as to induce sliding, and therefore cleaning, contact between said work pieces and said light projection means.

6. The improved apparatus claimed in claim 1 including transparent cover means in said projector assembly and said photoreceptor means mounted between said lens and said work piece and said photo detector means and said work piece respectively.

* * * * *